June 21, 1949.  J. H. HITCHCOCK  2,473,709
MACHINE FOR MANUFACTURING SPHERICAL GEARS
Filed May 4, 1943   2 Sheets-Sheet 2

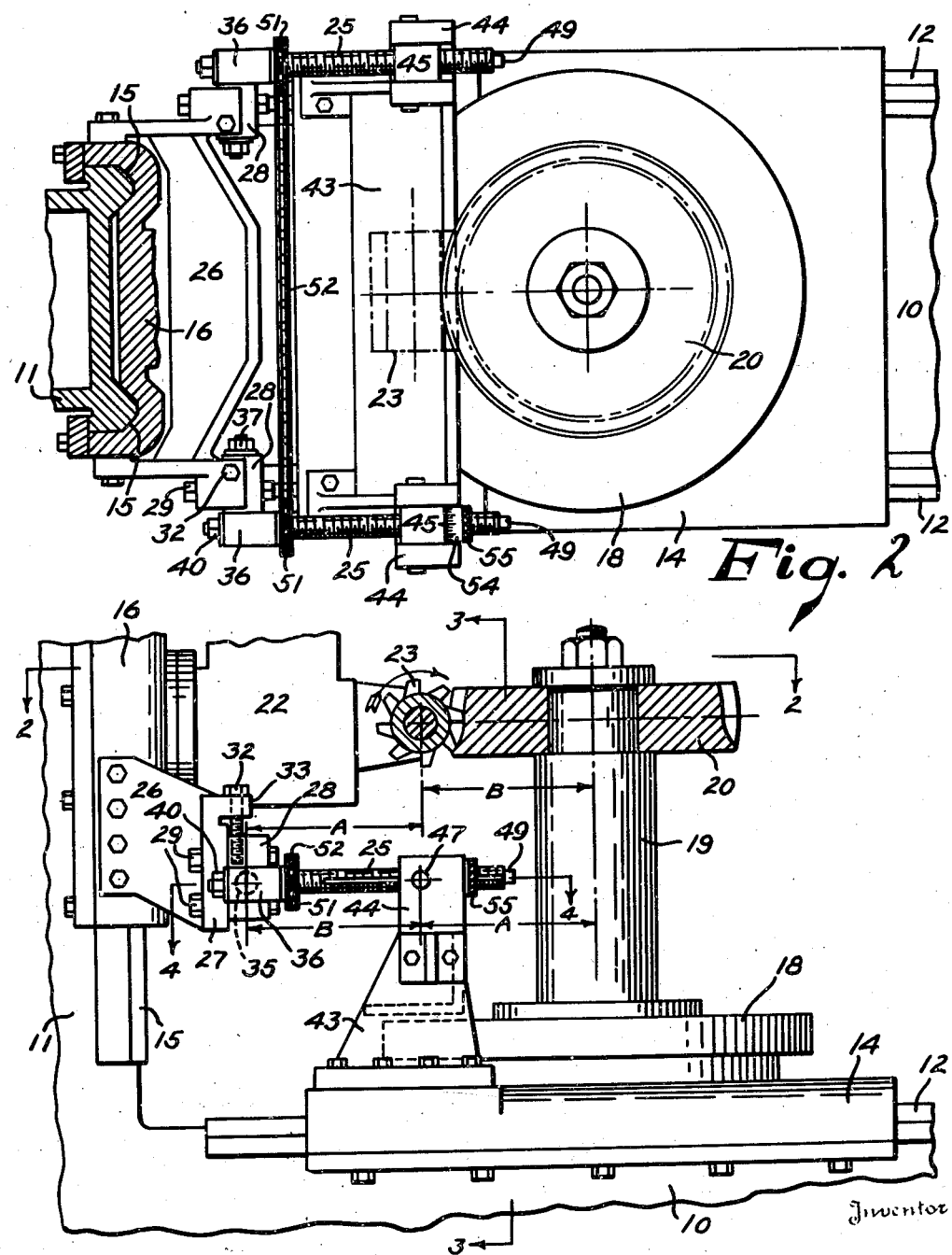

Inventor
JOHN H. HITCHCOCK
By Albert G. Blodgett
Attorney

Patented June 21, 1949

2,473,709

UNITED STATES PATENT OFFICE 2,473,709

MACHINE FOR MANUFACTURING SPHERICAL GEARS

John H. Hitchcock, Worcester, Mass., assignor to Morgan Construction Company, Worcester, Mass., a corporation of Massachusetts Application May 4, 1943, Serial No. 485,602

9 Claims. (Cl. 90—4)

This invention relates to gear cutting machines, and more particularly to a machine for cutting gears with curved teeth, such as spherical gears of the type suitable for use in rotary shaft couplings, as shown for example in the patent to Morgan, No. 2,136,947.

It has been the practice heretofore to cut the teeth on such gears one tooth at a time with a rotary milling cutter. This necessitates indexing of the gear blank for each tooth, and it is very difficult to obtain the extremely accurate tooth spacing required for these gears. Furthermore, the process is relatively slow and inefficient, and the operator must be in continuous attendance.

It is accordingly one object of the invention to provide an improved apparatus for manufacturing curved tooth gears, which will eliminate the need for indexing the gear blank to obtain a desired tooth spacing.

It is a further object of the invention to provide an improved apparatus whereby spherical gears can be manufactured with great accuracy and with comparative rapidity.

It is a further object of the invention to provide an improved machine tool which is arranged to cut the teeth on spherical gears in an automatic manner with but little attention on the part of the operator.

With these and other objects in view, as will be apparent to those skilled in the art, the invention resides in the combination of parts set forth in the specification and covered by the claims appended hereto.

Referring to the drawings illustrating one embodiment of the invention and in which like reference numerals indicate like parts.

Fig. 1 is a fragmentary side elevation of a gear hobbing machine, with the hub and gear blank shown in section for clearness of illustration;

Fig. 2 is a section taken on the line 2—2 of Fig. 1;

Figure 3:
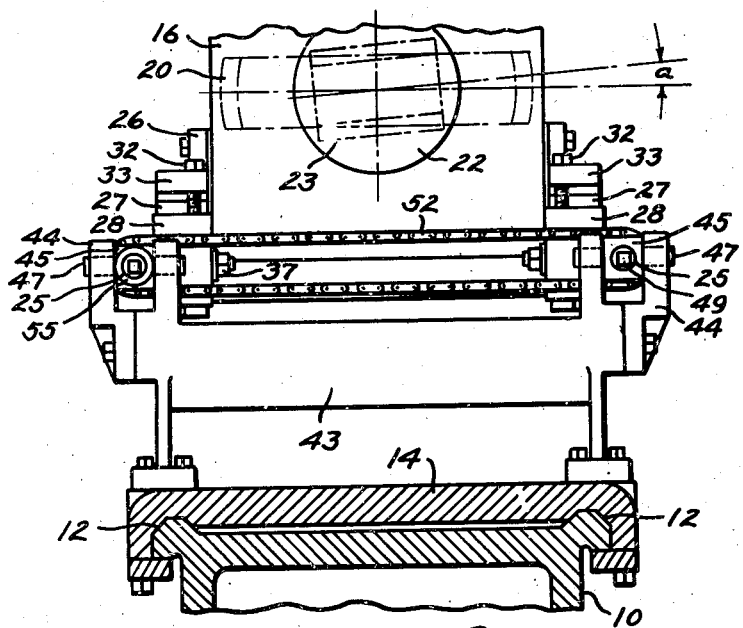
Fig. 3 is a section taken on the line 3—3 of Fig. 1.

The embodiment illustrated comprises a main frame 10 extending horizontally, and an upright portion 11 at one end of the frame and preferably integral therewith. The frame 10 is provided with a pair of parallel horizontal ways 12 forming a guideway for a work slide or carriage 14. The upright portion 11 is provided with a pair of vertical ways 15 forming a guideway for a tool slide or carriage 16. The work slide 14 supports a table 18 which is rotatable about a vertical axis, and on the center of this table there is mounted an upright post 19 to the upper end of which the gear blank 20 is suitably fastened, with the axis of the gear blank coinciding with that of the table. The periphery of the gear blank has preferably been previously machined by any suitable and well-known means to provide an accurate spherical surface. The tool slide 16 carries a cutter head 22 on which there is mounted a helical cutter or hob 23 of the desired pitch, the cutter head being adjustable about a horizontal axis which intersects the axis of the hob and the vertical axis of the table 18. Suitable driving means is provided to rotate the table 18 and the hob 23 about their respective axes at relative speeds inversely proportional to the ratio of the number of teeth to be formed on the gear and the number of threads on the hob. Thus, if the hob has a single thread (as is preferable) and the gear is to have say forty teeth, the hob would make forty revolutions for every revolution of the table. In addition, suitable means is provided to move the tool slide 16 along the vertical ways 15 at a speed corresponding to the desired rate of feed. As so far described, machines of this type are well-known and they are commonly used for hobbing helical gears. For a more complete disclosure of such a machine, reference may be had to the patent to Eberhardt et al. No. 1,036,199, granted August 20, 1912.

The present invention provides a change in the construction and mode of operation of prior hobbing machines, whereby during the cutting of the gear teeth the hob is caused to remain at a fixed distance from a point on the axis of the gear blank. This point may be described as the "center" of the gear blank and it will ordinarily be located midway between the two opposite faces of the blank. The mode of operation of the present invention thus involves a continuous change in the distance between the hob and the axis of the gear blank during the cutting of the teeth. This change in distance may be brought about by moving the gear blank, by moving the hob, or by moving both the gear blank and the hob.

In the preferred construction illustrated the gear blank is moved to and from the hob, and for this purpose the work slide 14 is moved along the horizontal ways 12 in a predetermined relationship to the movements of the tool slide 16 along the vertical ways 15. This is brought about by means of one or more links 25 (two being shown) which are connected to both slides 14 and 16, these links being parallel with the line joining the center of the hob with the center of the gear blank, and each having an effective length equal to the length of the said line. By adjusting the effective length of these links, it is possible to cut spherical gears of different diameters.

Figure 4:
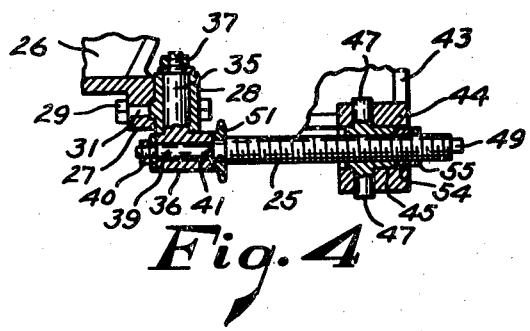
Fig. 4 is a section taken on the line 4—4 of Fig. 1.

In order to connect these links 25 with the tool slide 16, a suitably shaped bracket 26 is secured to the lower portion of this slide and extends across the front thereof beneath the cutter head 22. On each end of this bracket there is provided a laterally extending vertical flange 27 to the front face of which a block 28 is fastened by means of bolts 29. As shown in Fig. 4, the block and the flange are shaped to provide a tongue-and-groove joint, and the bolts 29 extend through a vertical slot 31 in the flange, so that the block can be adjusted vertically after the bolts are loosened. This adjustment is facilitated by a screw 32 (Fig. 1) which extends downwardly through a lug 33 at the top of the flange 27 and into a tapped hole in the top of the block. Each block 28 is bored to receive a trunnion 35 which projects from the inner side of a swivel block 36, as best shown in Fig. 4, the inner end of the trunnion being reduced and threaded to receive a retaining nut 37. Each swivel block is bored to receive the rear portion 39 of the corresponding link 25, the latter being threaded on its rear end to receive a retaining nut 40. A shoulder 41 is provided at the front end of each portion 39, the construction being such that the links may be rotated within the swivel block 36 but cannot move axially therethrough.

In order to connect the links 25 to the work slide 14, a suitably shaped bracket 43 is secured to the rear portion of this slide and extends across the top thereof behind the post 19 and beneath the gear blank 20. On each end of this bracket there is provided an upwardly extending fork 44 for the reception of a swivel block 45 having oppositely extending trunnions 47 journaled in the respective branches of the fork. Each block 45 has a threaded hole extending therethrough at right angles with the trunnions 47 for the reception of the front portion of the corresponding link 25, which is correspondingly threaded. On the front end of each link 25 there is provided a square lug 49 to which a suitable wrench may be applied to turn the link and thus adjust the effective length thereof. In order to ensure simultaneous and uniform adjustment of the links, a sprocket 51 is keyed to each link immediately in front of the rear swivel blocks 36, and these sprockets are connected by an endless chain 52. A graduated collar 54 is slidably keyed to one of the links 25 in front of the front swivel block 45, and a knurled lock nut 55 is mounted on the link 25 in front of this collar.

As indicated by the two dimensions "A" in Fig. 1, the horizontal distance between the rear trunnions 35 and the axis of the hob 23 is equal to the horizontal distance between the front trunnions 47 and the axis of the gear blank 20, both of these distances being measured parallel with the horizontal ways 12. Consequently, and as indicated by the two dimensions "B," the distance between the axis of the hob 23 and the axis of the gear blank 20, when the links 25 are horizontal, will be equal to the distance between the rear trunnions 35 and the front trunnions 47, i. e. the effective length of the links. As the tool slide 16 is raised or lowered, and the links 25 assume inclined positions, the work slide 14 will be moved along the ways 12 to maintain a fixed distance between the hob and the center of the gear blank.

The operation of the invention will now be apparent from the above disclosure. The gear blank 20 will be mounted upon the post 19, and a hob 23 of the proper pitch will be mounted upon the cutter head 22, the latter being adjusted to incline the axis of the hob to the plane of rotation of the gear blank at an angle $a$ (Fig. 3) corresponding to the helix angle of the hob, just as though a straight-tooth spur gear were to be cut. Properly selected driving gears will be installed in the machine to rotate the hob and the gear blank at the correct speed ratio corresponding to the number of teeth to be cut. The tool slide 16 will then be raised or lowered, as may be required, to bring the center of the hob to the same height as the center of the gear blank. After loosening the bolts 29, the operator will now turn the screws 32 to raise or lower the blocks 28, as is found necessary, to bring the links 25 into horizontal positions, as indicated for example by an accurate level or otherwise, whereupon the bolts 29 will be tightened. This adjustment of course need not be repeated for subsequent gears of the same size. By turning the screw links 25, the operator will now move the work slide 18 rearwardly toward the upright 11 until the hob just touches the gear blank. The tool slide 16 will now be raised to bring the hob above the gear blank, and the screw links 25 will be turned to shorten their effective length an amount equal to the desired depth of cut, as indicated by the graduated collar 54. With the hob and blank rotating at the correct speeds, the tool slide 16 will now be connected to its power feed, carrying the hob downwardly in cutting relation with the blank. The links 25 will move the work slide 14 and the gear blank first away from the hob until the center of the hob is at the same height as the center of the blank (when the links will be level), and then toward the hob until the cutting has been completed, the distance between the center of the hob and the center of the blank remaining fixed. Thus a gear will be formed with a spherical pitch surface, and with tooth spaces of uniform shape and size from end to end. Obviously both roughing and finishing cuts can be made, as is ordinarily desirable.

Once the cutting has been started, it will proceed automatically and continuously without attention on the part of the operator. No indexing is required, and highly accurate tooth spacing will be obtained. Furthermore, the hob is capable of removing metal at a rapid rate, and the time required to finish a gear will be comparatively small. Both the hob and the gear blank are rigidly supported, and as a result the teeth will be finished smoothly and accurately.

Having thus described my invention, what I claim as new and desire to secure by Letters Patent is:

1. A machine for manufacturing spherical gears comprising a work carrier, a tool carrier, means to support a gear blank on the work carrier for rotation about its axis, means to support a helical cutter on the tool carrier for rotation about an axis inclined to the plane of rotation of the blank at an angle equal to the helix angle of the cutter, driving means to rotate the blank and the cutter at relative speeds inversely proportional to the ratio of the number of teeth to be cut to the number of threads in the cutter, means to move one of the carriers in a general direction parallel with the axis of the blank, and a link connecting the two carriers and extending parallel with the line joining the center of the cutter and the center of the blank, the link having an effective length equal to the length of the said line, the link serving to move one of the carriers in such a manner as to maintain a fixed distance between the center of the cutter and the center of the blank.

2. A machine for manufacturing spherical gears comprising means providing a guideway, a work carrier, a tool carrier movable along the said guideway, means to support a gear blank on the work carrier for rotation about an axis parallel with the guideway, means to support a helical cutter on the tool carrier for rotation about an axis inclined to the plane of rotation of the blank at an angle equal to the helix angle of the cutter, driving means to rotate the blank and the cutter at relative speeds inversely proportional to the ratio of the number of teeth to be cut to the number of threads in the cutter, means to move the tool carrier along the guideway, and a link connecting the tool carrier to the work carrier and extending parallel with the line joining the center of the cutter and the center of the blank, the link having an effective length equal to the length of the said line, the link serving to move one of the carriers in a direction perpendicular to the said guideway and maintain a fixed distance between the center of the cutter and the center of the blank.

3. A machine for manufacturing spherical gears comprising a frame providing two guideways arranged at a right angle, a work slide movable along one guideway, a tool slide movable along the other guideway, means to support a gear blank on the work slide for rotation about an axis parallel with the tool slide guideway, means to support a helical cutter on the tool slide for rotation about an axis inclined to the plane of rotation of the blank at an angle equal to the helix angle of the cutter, driving means to rotate the blank and the cutter at relative speeds inversely proportional to the ratio of the number of teeth to be cut to the number of threads in the cutter, means to move the tool slide along its guideway, and a link connecting the tool slide to the work slide and extending parallel with the line joining the center of the cutter and the center of the blank, the link having an effective length equal to the length of the said line, the link serving to move the work slide along its guideway and maintain a fixed distance between the center of the cutter and the center of the blank.

4. A machine for manufacturing spherical gears comprising a frame providing a horizontal guideway and a vertical guideway, a work slide movable along the horizontal guideway, a tool slide movable along the vertical guideway, means to support a gear blank on the work slide for rotation about a vertical axis, means to support a helical cutter on the tool slide and at the rear of the gear blank for rotation about an axis inclined to the horizontal at an angle equal to the helix angle of the cutter, driving means to rotate the blank and the cutter at relative speeds inversely proportional to the ratio of the number of teeth to be cut to the number of threads in the cutter, means to move the tool slide along the vertical guideway, and a link pivotally connected at its opposite ends to the tool slide and to the work slide and extending parallel with the line joining the center of the cutter and the center of the blank, the horizontal distance between the rear end of the link and the axis of the cutter being equal to the horizontal distance between the front end of the link and the axis of the blank, both of these distances being measured parallel with the horizontal guideway, the link serving to move the work slide along the horizontal guideway and maintain a fixed distance between the center of the cutter and the center of the blank.

5. A machine for manufacturing spherical gears comprising a frame providing a horizontal guideway and a vertical guideway, a work slide movable along the horizontal guideway, a tool slide movable along the vertical guideway, means to support a gear blank on the work slide for rotation about a vertical axis, means to support a helical cutter on the tool slide for rotation about an axis inclined to the horizontal at an angle equal to the helix angle of the cutter, driving means to rotate the blank and the cutter at relative speeds inversely proportional to the ratio of the number of teeth to be cut to the number of threads in the cutter, means to move the tool slide along the vertical guideway, and a link connecting the tool slide to the work slide and extending parallel with the line joining the center of the cutter and the center of the blank, the link having an effective length equal to the length of the said line, the link serving to move the work slide along the horizontal guideway and maintain a fixed distance between the center of the cutter and the center of the blank.

6. A gear cutting machine comprising a work carrier, a tool carrier, means to support a gear blank on the work carrier for rotation about its axis, means to support a helical cutter on the tool carrier for rotation about an axis inclined to the plane of rotation of the blank at an angle equal to the helix angle of the cutter, driving means to rotate the blank and the cutter at relative speeds inversely proportional to the ratio of the number of teeth to be cut to the number of threads in the cutter, means to move one of the carriers in a general direction parallel with the axis of the blank, and a link pivotally connected at its opposite ends to the respective carriers and arranged to move one of the carriers in such a manner that the path of the cutter relative to the blank will be along the arc of a circle.

7. A gear cutting machine comprising means providing a guideway, a work carrier, a tool carrier movable along the said guideway, means to support a gear blank on the work carrier for rotation about an axis parallel with the guideway, means to support a helical cutter on the tool carrier for rotation about an axis inclined to the plane of rotation of the blank at an angle equal to the helix angle of the cutter, driving means to rotate the blank and the cutter at relative speeds inversely proportional to the ratio of the number of teeth to be cut to the number of threads in the cutter, means to move the tool carrier along the guideway, and a link pivotally connected at its opposite ends to the respective carriers and arranged to move one of the carriers in a direction perpendicular to the said guideway and cause the path of the cutter relative to the blank to be along the arc of a circle.

8. A gear cutting machine comprising a frame providing two guideways arranged at a right angle, a work slide movable along one guideway, a tool slide movable along the other guideway, means to support a gear blank on the work slide for rotation about an axis parallel with the tool slide guideway, means to support a helical cutter on the tool slide for rotation about an axis inclined to the plane of rotation of the blank at an angle equal to the helix angle of the cutter, driving means to rotate the blank and the cutter at relative speeds inversely proportional to the ratio of the number of teeth to be cut to the number of threads in the cutter, means to move the tool slide along its guideway, and a link connecting the tool slide to the work slide and serving to move the work slide along its guideway in such a manner that the path of the cutter relative to the blank will be along the arc of a circle.

9. A gear cutting machine comprising a frame providing a horizontal guideway and a vertical guideway, a work slide movable along the horizontal guideway, a tool slide movable along the vertical guideway, means to support a gear blank on the work slide for rotation about a vertical axis, means to support a helical cutter on the tool slide for rotation about an axis inclined to the horizontal at an angle equal to the helix angle of the cutter, driving means to rotate the blank and the cutter at relative speeds inversely proportional to the ratio of the number of teeth to be cut to the number of threads in the cutter, means to move the tool slide along the vertical guideway, and a link pivotally connected at its opposite ends to the tool slide and to the work slide, the link serving to move the work slide along the horizontal guideway in such a manner that the path of the cutter relative to the blank will be along the arc of a circle.

JOHN H. HITCHCOCK.

REFERENCES CITED

The following references are of record in the file of this patent:

UNITED STATES PATENTS

| Number | Name | Date |
| --- | --- | --- |
| 1,036,199 | Eberhardt et al. | Aug. 20, 1912 |
| 1,639,624 | Woltzendorf | Aug. 16, 1927 |
| 2,211,611 | Staples | Aug. 13, 1940 |
| 2,273,050 | Kruse | Feb. 17, 1942 |
| 2,282,288 | Plensler | May 5, 1942 |
| 2,307,428 | Staples | Jan. 5, 1943 |
| 2,315,068 | Matthews | Mar. 30, 1943 |